United States Patent [19]
Alewitz

[11] 3,726,548
[45] Apr. 10, 1973

[54] PIPE FITTING
[75] Inventor: Sam Alewitz, Painesville, Ohio
[73] Assignee: Perfection Corporation, Madison, Ohio
[22] Filed: Apr. 29, 1971
[21] Appl. No.: 138,608

[52] U.S. Cl. .................285/249, 285/342, 285/331, 285/371
[51] Int. Cl. .............................................F16l 33/00
[58] Field of Search.....................285/371, 331, 398, 285/DIG. 7, 334, 341, 342, 343, 249

[56] References Cited

UNITED STATES PATENTS

| | | | |
|---|---|---|---|
| 3,578,805 | 5/1971 | Putton | 285/343 |
| 1,042,587 | 10/1912 | Moore | 285/371 X |

FOREIGN PATENTS OR APPLICATIONS

| | | | |
|---|---|---|---|
| 854,939 | 1/1940 | France | 285/371 |
| 40,656 | 4/1932 | France | 285/331 |
| 914,803 | 7/1954 | Germany | 285/371 |
| 904,639 | 8/1962 | Great Britain | 285/331 |
| 192,697 | 10/1957 | Germany | 285/371 |

*Primary Examiner*—Dave W. Arola
*Attorney*—Fay, Sharpe and Mulholland

[57] ABSTRACT

A pipe fitting adapted to connect a section of plastic pipe to a fitting body. The fitting comprises a hollow metallic body into which is disposed a plastic sleeve. An annular ring is disposed within the sleeve. A second sleeve is disposed within the hollow body and is attached to the ring such that a socket is defined by the first and second sleeves. The socket has a transverse dimension slightly in excess of the wall thickness of the plastic pipe so that the pipe may be snugly received within the socket. A gasket and compression nut provide sealing between the plastic pipe and the fitting body.

7 Claims, 2 Drawing Figures

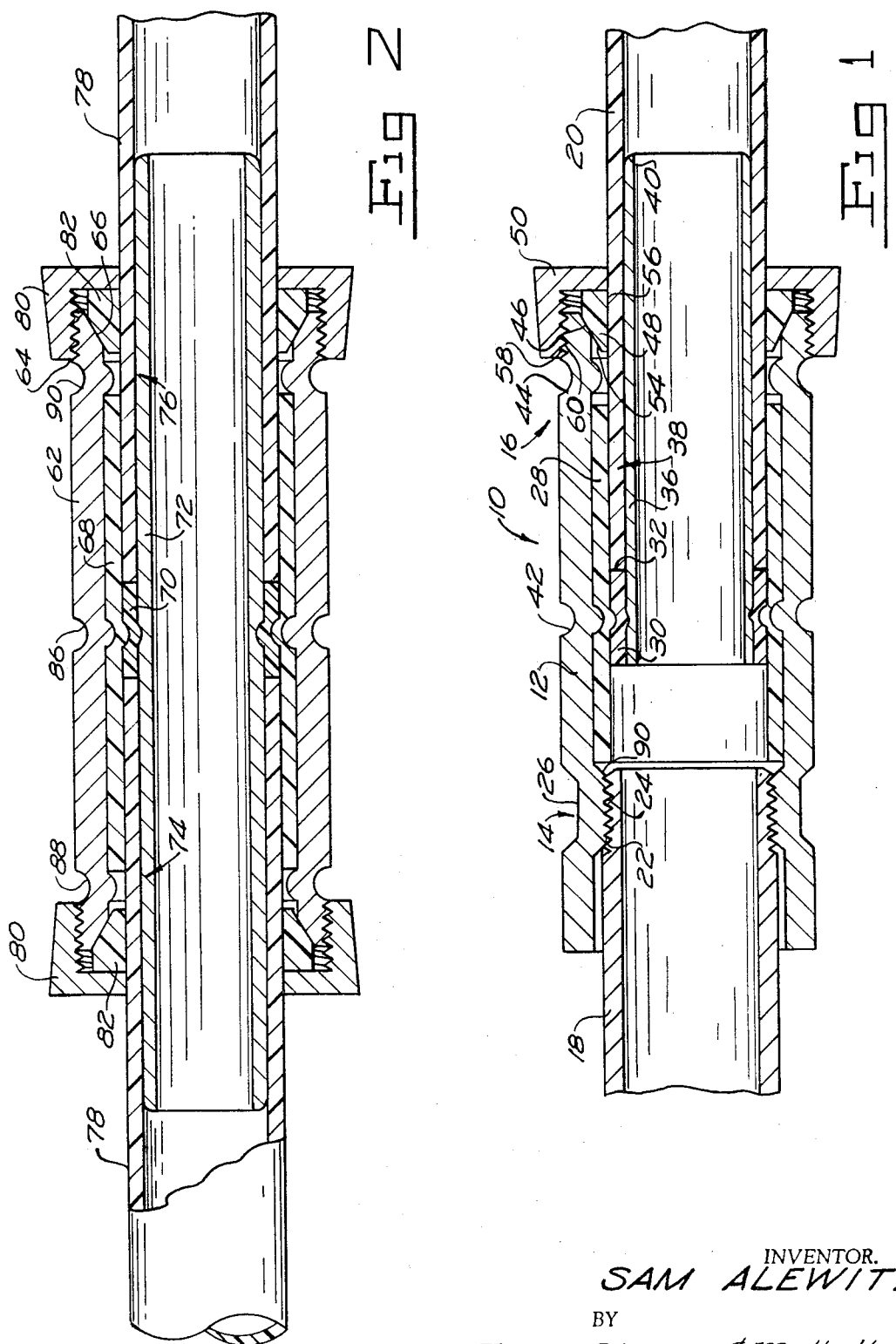

PIPE FITTING

BACKGROUND OF THE INVENTION

This invention relates to a pipe fitting for interconnecting lengths of plastic pipe or, alternately, for interconnecting a length of plastic pipe with a length of metal pipe.

The underground transmission of natural gas and other such fluids is usually accomplished by means of heavy black steel pipe. More recently, however, the use of plastic pipe in gas applications has become more evident. Similarly, plastic pipe has been increasingly used in the above ground transmission of corrosive fluids. Thus, there has developed a need for a fitting by means of which a length of plastic pipe can be connected to a length of steel pipe or, alternately, in which a length of plastic pipe can be connected to another length of plastic pipe.

This invention is directed to a transition pipe fitting by means of which plastic pipe may be connected to steel or other metal pipe.

This invention is further directed to a coupling means for securing plastic or other pipe to a fitting body so that the pipe may be interconnected in fluid communication with another pipe of either plastic or metallic construction. This invention, thus, is broadly applicable to plastic-to-plastic or plastic-to-metal pipe fittings.

BRIEF DESCRIPTION OF THE INVENTION

Briefly described, this invention provides a pipe fitting comprising a generally cylindrical hollow body and including first and second attaching means to secure first and second pipes to said body in fluid communication. When it is desired to connect a metal pipe to the fitting, the first attaching means may take the form of internal threads in the fitting body.

The second attaching means of the fitting body serves the purpose of rigidly securing plastic pipe to the body. Such second attaching means is comprised of a first sleeve received within a body and an annular ring extending generally radially inwardly from the sleeve. A second sleeve is secured to the ring and is spaced from the first sleeve thus defining a socket into which a second pipe may be disposed. The dimensional characteristics of the socket are such that the second pipe is snugly received within the socket. Adhesive or other suitable joining materials may be used to enhance the retention of the second pipe in the socket. Gripping and sealing means in the form of an elastomeric gasket and a compression nut threadedly engaged with the fitting body are provided for the purpose of sealing the fitting body and the pipe.

DESCRIPTION OF THE INVENTION

A more complete description of the invention will now be made with reference to the attached drawings in which:

FIG. 1 is an elevational cross-sectional view of a female connector of this invention in which a plastic pipe is joined in fluid communication with a metal pipe; and FIG. 2 is an elevational cross-sectional view of a union fitting of this invention in which two plastic pipes are joined in fluid communication end-to-end.

Turning now to FIG. 1, there is shown a fitting 10 in the form of a female connector element. Fitting 10 is comprised of a generally cylindrical hollow body 12 having first and second attaching means 14, 16 for the purpose of securing first and second pipes 18, 20 to body 12. In the embodiment of FIG. 1, pipe 18 is a black steel pipe such as used in gas service and includes external pipe threads 22 at one end thereof. Threads 22 are adapted to engage complementary threads 24 defined on an internal surface of body 12. Such internal surface is defined as by forming a land 26 in body 12 by means of a roll die or the like.

In a roll die operation a portion of body 12 is upset thus to define a land 26 having a prescribed length. The length of land 26 may be varied depending upon particular conditions and the desired number of threads required on the fitting body in order to receive pipe 18. For a more complete description of a roll die operation reference is made to the Jacobson U.S. Pat. No. 3,093,161.

The second attaching means 16 of the fitting body 10 is defined by a first sleeve 28 disposed within the fitting body. Sleeve 28 is generally cylindrical and, in the preferred embodiment of FIG. 1, is formed from polyethylene or other such material. A ring 30 fabricated from polyethylene or elastomeric material is disposed within and attached to sleeve 28 so as to define a flange extending generally radially inwardly from the sleeve 28. Flange 30 defines a shoulder 32 adapted to be contacted by pipe 20 as will be described more fully hereafter.

A second sleeve 36 is secured to the inner surface of the ring 30. Sleeves 28, 36 and ring 30 thus define a socket 38 into which pipe 20 is disposed.

In the preferred embodiment of FIG. 1, sleeve 36 is fabricated from metal and serves as a stiffener for plastic pipe 20. The outer end 40 of sleeve 36 is slightly rounded in order to facilitate the entry of sleeve 36 into pipe 20.

In the preferred embodiment of FIG. 1 the various elements of the plastic pipe attaching means including the sleeve 28, ring 30, and sleeve 36, are retained in place by means of a groove 42 imparted to the surface of body 12 by means of a suitable roll die in a manner previously described. The grooving operation, providing for the establishment of groove 42, upsets sufficient material of body 12 to indent sleeve 28, ring 30, and also sleeve 36. These members are thus rigidly secured together and locked against axial movement. A second groove 44 further restrains sleeve 28 and cooperates with shoulder 90 to prevent axial movement of the sleeve 28.

The depth and width of groove 42 may be controlled during the rolling operation to provide a suitable locking mechanism for the members 28, 30 and 36. It has been found that even where relatively large diameter pipes are used the second sleeve 36 is rigidly locked to the ring 30 and firmly retained within the body 12 by the groove 42. Where the ring 30 is fabricated from a non-metallic material such as a polymer or an elastomer, the grip provided the second sleeve 36 by the groove 42 appears to be particularly well enhanced.

As is evident from FIG. 1, socket 38 has a transverse dimension slightly in excess of the wall thickness of pipe 20 such that pipe 20 is snugly received within the socket.

Sealing and gripping means adapted to cooperate with the fitting body and the external surface of pipe 20 are provided at the end of body 12. Such sealing and gripping means is defined by a tapered or generally frusto-conical seat 46 defined in body 12, an elastomeric gasket 48, and a compression nut 50.

Gasket 48 is defined by a tapered external surface 54 adapted to cooperate with seat 46, and an internal cylindrical wall 56 adapted to sealingly engage the external surface of pipe 20.

Compression nut 50 is provided with threads 58 adapted to engage complementary threads 60 provided on body 12. As compression nut 50 is advanced onto body 12, gasket 48 will be caused to become compressed or wedged within the space defined by the seat 46 and the internal walls of compression nut 50 with the result that surface 54 will sealingly abut seat 46 and wall 56 will provide sealing engagement with the external surface of pipe 20.

Gasket 48 and compression nut 50 cooperate to provide both sealing and gripping of the pipe 20. The sealing function of gasket 48 serves to retain any fluid that may leak past the sleeve 28 or past the inner end of pipe 20 thus to retain such fluid within the confines of the fitting body 12. The gripping action of the gasket 48 serves to increase the pull resistance of pipe 20 thus making it difficult to separate pipe 20 from the fitting body by application of an axial force to pipe 20.

In order to enhance the sealing of the fitting a resin or other adhesive may be applied at the interface of the external surface of pipe 20 with the internal surface of sleeve 28. Sleeve 28, in the preferred embodiment of FIG. 1, extends over the inner end of pipe 20 a distance sufficient to insure the establishment of an adequate adhesion surface. Through the application of a resin or other adhesive to the end of pipe 20 before assembly of the fittings, a fluid tight connection is established between the pipe 20 and the liner 28 as the fitting is made up. Similarly a small amount of adhesive may be applied to the end of pipe 20 in order to provide sealing at the shoulder 32 after pipe 20 engages the shoulder.

Turning now to the external surface of the liner 28, adhesive may be applied to such surface in order to enhance sealing between liner 28 and the internal wall of body 12. Similarly, adhesive may be used on the external surface of the sleeve 36 and on the external surfaces of ring 30.

Turning now to FIG. 2 there is shown an alternate embodiment of the invention in which the plastic pipe attaching means is provided at either end of the fitting body in order to define a union coupling for the purpose of securing plastic pipe to plastic pipe. Thus, in FIG. 2 there is shown a fitting body 62 having identical ends defined by a thread surface 64 and a tapered seat 66. A first sleeve 68 is disposed within body 62 and a ring 70 is disposed within sleeve 68. A second sleeve 72 is attached to ring 70. Sleeve 72 together with sleeve 68 and ring 70 define a pair of sockets 74, 76 for the purpose of receiving pipes 78.

A pair of compression nuts 80 are provided at either end of body 62 and together with gaskets 82 provide sealing and gripping means for each of the pipes 78 in a manner similar to that described with reference to FIG. 1. It should be understood that in all respects the attaching means for the respective pipes 78 of FIG. 2 is similar to that described with reference to the attaching means for the pipe 20 of FIG. 1.

To retain the several elements of FIG. 2 together a groove 86 is defined in the body 62. Other grooves 88, 90 are defined to restrain axial movement of sleeve 68.

MODIFICATIONS OF THE INVENTION

Several modifications of the preferred embodiment should be considered within the spirit of the invention.

The invention is broadly directed to attaching means for securing plastic or other pipe to a fitting body. The body itself, in alternate embodiments, could be fabricated as a part of a valve or other instrument to which it is desired to attach a pipe. Alternately, the body could take forms not shown in the drawings, including such forms as an elbow, tee, male connector, cross, or other fitting form well known to those skilled in the art.

In FIG. 1 the particular attaching means for securing the pipe 18 to the fitting body is shown as interengaging pipe threads. In alternate embodiments pipe 18 could be secured to body 12 utilizing other coupling structures well known to those skilled in the art such as welding, brazing, ferrule type fittings, etc.

Ring 30 of FIG. 1 is defined by a generally annular non-metallic element. In alternate embodiments ring 30 could be defined as an integral part of sleeve 28. Thus, shoulder 32 could be defined by an inwardly directed flange extending from sleeve 28.

Since the basic function of ring 30 is to provide support for sleeve 36, other support means for such sleeve should be considered within the spirit of the invention.

While groove 42 functions to secure the several sleeves and the ring together, other attaching means such as adhesives and pins should be considered within the spirit of the invention.

The use of adhesives at the pipe 20 and the sleeves 28, 36, while desirable, should not be considered limiting. Depending on tolerances and pressure conditions, adhesives may be eliminated.

The particular sealing and gripping means 48, 50 of the preferred embodiment is illustrative of the preferred embodiment. Other sealing and gripping means for the pipe 20 should be considered within the scope of the invention.

What is claimed is:

1. A fitting comprising:
   a generally cylindrical hollow body;
   attaching means to secure a hollow pipe to said body, said attaching means comprising;
   a first sleeve received within said body and secured thereto,
   a flange extending generally radially inwardly from said first sleeve,
   a second sleeve formed from rigid material secured to said flange, said second sleeve being spaced from said first sleeve thus defining an annular socket into which a hollow pipe may be disposed,
   said socket having a substantially constant transverse dimension in section slightly in excess of the wall thickness of the pipe such that the pipe may be snugly received within said socket,
   gripping and sealing means adapted to cooperate with said body and the external surface of the pipe in order to retain fluid and the pipe within said body, said first and second sleeves extending axially from said flange with said first sleeve terminating short of said sealing and gripping means and said second sleeve extending completely through said sealing and gripping means.

2. The invention of claim 1 in which said body is metal and said first sleeve is non-metal.

3. The invention of claim 2 in which said second sleeve is metal.

4. The invention of claim 1 in which said gripping and sealing means is defined as;
a tapered seat in said body,
an elastomeric gasket having a tapered external surface adapted to cooperate with said seat and an internal cylindrical wall adapted to cooperate with the external surface of the pipe, and
a compression nut adapted to be threaded onto said body so as to wedge said gasket into said seat and the pipe.

5. The invention of claim 1 in which said flange is defined as a non-metallic ring disposed within said first sleeve and secured thereto.

6. The invention of claim 1 in which said first sleeve is secured within said body by means of interlocking annular ribs defined in said body and said first sleeve.

7. The invention of claim 1 in which said first sleeve, said flange and said second sleeve are secured within said body by means of interlocking annular ribs defined in said body, said first sleeve, said flange and said second sleeve.

* * * * *